United States Patent [19]

Entenmann et al.

[11] Patent Number: 5,231,830
[45] Date of Patent: Aug. 3, 1993

[54] ADAPTIVE CLOSED-LOOP KNOCK CONTROL FOR A TURBOCHARGED ENGINE

[75] Inventors: Robert Entenmann, Benningen; Bernhard Stengel, Tamm; Stefan Unland, Schwieberdingen; Matthias Philipp, Stuttgart; Oskar Torno, Schwieberdingen; Ulrich Rothhaar, Stuttgart; Siegfried Rohde, Oberriexingen, all of Fed. Rep. of Germany

[73] Assignee: Robert Bosch GmbH, Stuttgart, Fed. Rep. of Germany

[21] Appl. No.: 752,569

[22] PCT Filed: Mar. 10, 1990

[86] PCT No.: PCT/DE90/00178
§ 371 Date: Sep. 5, 1991
§ 102(e) Date: Sep. 5, 1991

[87] PCT Pub. No.: WO90/12208
PCT Pub. Date: Oct. 18, 1990

[30] Foreign Application Priority Data

Apr. 11, 1989 [DE] Fed. Rep. of Germany ....... 3911748

[51] Int. Cl.⁵ .................... F02B 37/12; F02P 5/14
[52] U.S. Cl. ...................... 60/602; 123/425
[58] Field of Search ............. 60/600, 601, 602, 603, 60/611; 123/425, 564

[56] References Cited

U.S. PATENT DOCUMENTS

| | | | |
|---|---|---|---|
| 4,509,331 | 4/1985 | Hirabayashi | 60/602 |
| 4,594,983 | 6/1986 | Takahashi et al. | 60/602 X |
| 4,646,522 | 3/1987 | Mamiya et al. | 60/602 |
| 4,715,184 | 12/1987 | Oosawa et al. | 60/602 |
| 4,856,481 | 8/1989 | Kamise et al. | 123/425 |
| 4,858,580 | 8/1989 | Kamise et al. | 123/425 |
| 4,882,695 | 11/1989 | Mieno et al. | 60/602 X |

FOREIGN PATENT DOCUMENTS

| | | |
|---|---|---|
| 0078054 | 5/1983 | European Pat. Off. |
| 3106579 | 9/1982 | Fed. Rep. of Germany |
| 3735382 | 4/1988 | Fed. Rep. of Germany |
| 2500066 | 8/1982 | France |
| 2524557 | 10/1983 | France |
| 88/08486 | 11/1988 | PCT Int'l Appl. |

Primary Examiner—Michael Koczo
Attorney, Agent, or Firm—Michael J. Striker

[57] ABSTRACT

The method for closed-loop knock control of a internal combustion engine, includes retarding the ignition angle when at least one cylinder knocks and then resetting the ignition angle at a later time. For internal combustion engines with a turbocharger, the method also includes reducing the boost pressure when an ignition-angle limiting value dependent on an exhaust gas temperature is reached, and then increasing the boost pressure again as soon as the ignition-angle limiting value is again crossed due to resetting of the ignition angle. The ignition angle and boost pressure values established are stored as a function of the respective operating condition of the internal combustion engine for adaptive process control and used as starting values when the same engine operating conditions are again reached.

18 Claims, 3 Drawing Sheets

ADAPTIVE CLOSED-LOOP KNOCK CONTROL FOR A TURBOCHARGED ENGINE

BACKGROUND OF THE INVENTION

The invention relates to a method for the closed-loop knock control of an internal combustion engine. A method for closed loop knock control is known in which—when one cylinder knocks an ignition angle retardation of at least this cylinder and then a resetting of the ignition angle is effected.

In the operation of an internal combustion engine, so-called "knocking" represents a critical operating condition which has an extremely unfavorable effect on the life of the internal combustion engine. A so-called closed-loop knock control which shifts the ignition angle in the "retarded" direction when a cylinder of the internal combustion engine knocks is known. This shift of the ignition angle allows knocking to be eliminated. After a certain time, controlled resetting to the original ignition angle, which is, for example, stored in a map, is effected. The controlled resetting is preferably carried out in steps until the controlled map angle is reached. If the cylinder knocks again, the process is repeated. The resetting is not carried out as far as the controlled map angle if knocking has already occurred previously. A retardation is then performed again starting from the current ignition angle.

A so-called adaptive closed-loop knock control is also known, in which the ignition angle at which the associated cylinder knocks with a permissible knocking intensity is stored. This ignition angle is used in subsequent control operations instead of an ignition angle stored in a map.

In turbocharged engines, ignition angle retardation is problematic because this leads to an increase in the exhaust gas temperature and thus to a possibly impermissible thermal loading of the turbine of the turbocharger.

SUMMARY OF THE INVENTION

In contrast, the method according to the invention for the closed-loop knock control of an internal combustion engine has the advantage that it can be employed in internal combustion engines with a turbocharger. According to the invention, when an ignition-angle limiting value dependent on the exhaust gas temperature of the internal combustion engine is reached, a reduction of the boost pressure of the turbocharger is effected. For as long as the ignition-angle limiting value is exceeded, the boost pressure, preferably in each case after a delay, is reduced by a defined amount. The boost pressure is increased again as soon as the ignition-angle limiting value is reassumed due to the resetting or controlled resetting of the ignition angle, the boost pressure values established being stored as a function of the respective operating condition of the internal combustion engine for the purpose of adaptive process control and adopted as starting values when the same operating conditions are driven to again. This is thus an adaptive closed-loop knock control with regard to the boost pressure, i.e. a closed-loop knock control which adapts itself. The exhaust gas temperature problems to be expected due to the ignition retardation are counteracted due to the reduction of the boost pressure. The associated data of the operating conditions driven to in each case are stored, enabling the already stored, i.e. "learned" values to be used again when a particular operating condition is reached once more. With regard to the ignition angle, it is also possible for the required retardations of the cylinders to be stored for adaptive process control, i.e. the "learned" ignition angle retardations come into effect very rapidly at, for example, a transition from idling to full load. In order to avoid an excessively high temperature of the outlet valves of the internal combustion engine and—as already mentioned—of the turbocharger, the boost pressure is immediately reduced by the adapted amount. This spontaneous boost pressure reduction does not even allow the exhaust gas temperature problems mentioned to occur in the first place.

According to a further development of the invention, it is envisaged that the ignition angle retardation and the resetting or controlled resetting of the ignition angle are effected stepwise.

With regard to the boost pressure reduction and the boost pressure increase too, the procedure can preferably be performed stepwise.

In knock-free operation of the internal combustion engine, an operating-condition-dependent ignition angle is taken as a basis. Provision is therefore preferably made for the ignition angle adjustment to be based on an operating-condition-dependent ignition angle value from a map. This value from the map is dependent on the load (e.g. intake manifold pressure) and the speed of the internal combustion engine.

The method according to the invention is distinguished by the fact that the current ignition angle is made up of the sum of the applicable ignition angle value from the map and an ignition-angle retardation component.

If knock-free operation is present, the ignition angle value from the map is adopted. If, however, knocking occurs, an ignition angle adjustment in the "retarded" direction is effected, i.e. the instantaneous ignition angle is made up of the operating-condition-dependent ignition angle value from the map and the additional ignition-angle retardation component due to the retardation.

As already explained, when the ignition-angle limiting value is exceeded, a reduction of the boost pressure is effected. As soon as the ignition-angle limiting value is assumed again when the ignition angle is reset, an increase in the boost pressure takes place. The ignition-angle limiting value is made up additively of two components, namely of the abovementioned ignition angle value from the map, which value is dependent on the load and the speed of the internal combustion engine, and of an increment ignition angle, which is dependent on the actual value of the boost pressure and the speed of the internal combustion engine. Consequently, the condition for the boost pressure reduction can also be defined independently of the ignition angle value from the map, boost pressure reduction being effected whenever the ignition-angle retardation component is greater than or equal to the increment ignition angle. For the boost pressure increase, the following condition is thus obtained: the ignition-angle retardation component is smaller than the increment ignition angle.

The boost pressure reduction is preferably performed by forming the difference between a boost-pressure setpoint value corresponding to the instantaneous operating condition and an operating-condition-independent normal boost pressure setpoint value corresponding to the ambient pressure and multiplying it by an adaptation factor. The adaptation factor can assume values between 0 and 1. In the case of an adaptation factor of 1, the full boost pressure setpoint value is thus available and—depending on the size of the adaptation factor—the setpoint value can be reduced to 0.

According to a further development of the invention, it is provided that the in each case current adaptation factors are stored in an adaptation map as a function of the operating condition (induction temperature and speed) of the internal combustion engine. This procedure will be explained in greater detail by way of example: for a particular induction temperature and speed, an associated adaptation factor is obtained—according to a principle to be explained below. This factor is stored at a correspondingly assigned point in the adaptation map. If this operating condition is departed from, for example by an increase in the speed, but is driven to again at a later point in time, then the stored adaptation factor is read out again for process control and used as initial quantity (starting value). If, due to the adaptive process, a new adaptation factor is obtained in the further course of operations, via corresponding learning steps, for this operating condition which has been driven to again, this is put in place of the hitherto employed adaptation factor, i.e. the corresponding memory location in the adaptation map is overwritten.

In order to limit the number of adaption factors stored in the adaptation map to a reasonable level also, each adaptation factor is assigned an induction temperature range and a speed range.

The adaptation map is preferably stored in a write-read memory (RAM).

The method according to the invention is preferably employed only after the nominal values of the internal combustion engine have been reached. For example, adaptive closed-loop knock control is not desired in the cold-running phase. Accordingly, the adaptation factors are only stored when the temperature of the internal combustion engine is higher than an enabling temperature. Although closed-loop knock control likewise occurs before this enabling temperature (cold-running phase) has been reached, this does not operate adaptively.

In the case of a restart of the internal combustion engine and a temperature below the enabling temperature, only one adaptation factor becomes active for all operating conditions and is set to the value 1. Although this value can become smaller during the cold-running phase, so that a corresponding boost pressure reduction occurs, in the case of a subsequent restart of the internal combustion engine the value 1 is then taken as a starting point again. This is fundamentally different from the process control at temperatures above the enabling temperature since, in this case, the stored adaptation factor appropriate to the operating condition present is taken as a starting point.

The boost pressure setpoint value is likewise dependent on the operating condition. It changes with the speed and throttle-valve opening angle of the internal combustion engine.

A boost pressure increase, i.e. an increasing of the adaptation factor, is only performed when the throttle-valve opening angle has exceeded a minimum value. This minimum value is dependent on the speed of the internal combustion engine.

BRIEF DESCRIPTION OF THE DRAWING

The invention is explained in greater detail below with reference to the figures, in which.

DETAILED DESCRIPTION OF A PREFERRED EMBODIMENT

Figure 1:
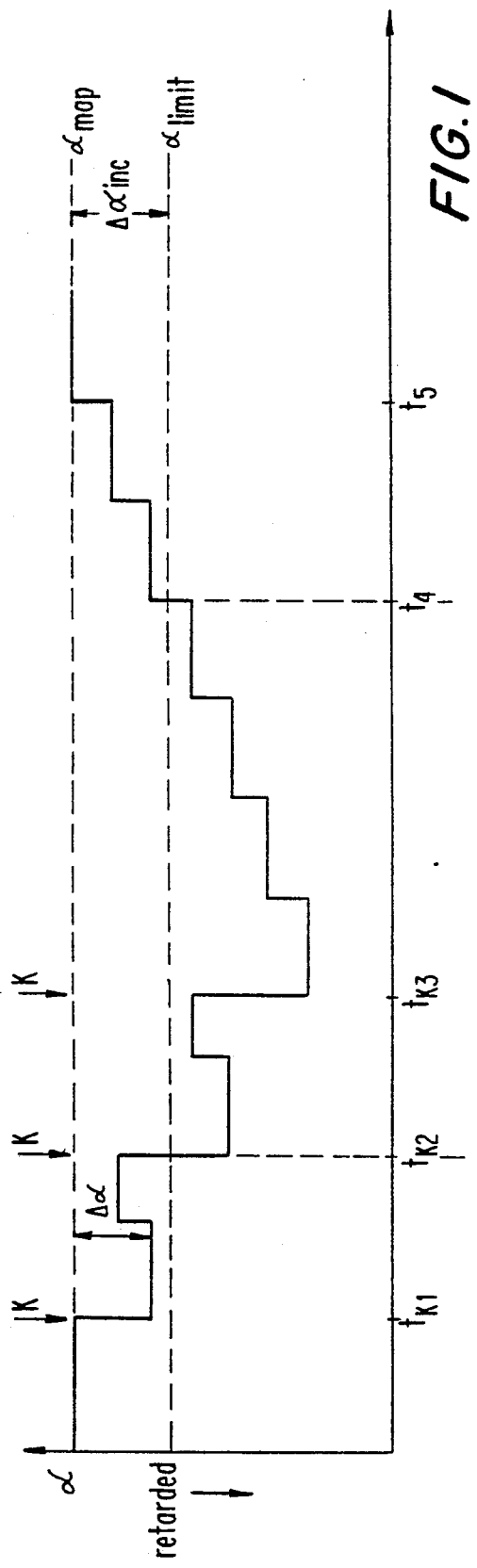
FIG. 1 is a graphical illustration of an ignition angle adjustment in the case of knocking of a cylinder of an internal combustion engine.

In the explanation of the method according to the invention for the closed-loop knock control of an internal combustion engine, it should be assumed that the engine has reached its operating temperature and is being operated at an ignition angle $\alpha$ derived from a map. This ignition angle value from the map $\alpha_{map}$ is dependent on the load or intake manifold pressure and the speed n of the internal combustion engine. It is represented in FIG. 1 as a dashed line. If, at time $t_{K1}$, knocking of a cylinder of the internal combustion engine occurs (this condition is indicated in FIG. 1 by an arrow designated "K"), then an ignition angle adjustment is effected stepwise in the "retarded" direction. This ignition angle retardation is performed stepwise (for example 3° of ignition angle retardation per step). If knocking is still present at time $t_{K2}$, the ignition angle $\alpha$ is retarded by a further 3° step etc. (Time $t_{K3}$). Starting from the angle value from the ignition map $\alpha_{map}$, the current ignition angle $\alpha$ accordingly increases by an ignition-angle retardation component $\Delta\alpha$ depending on the number of step adjustments.

Also represented in FIG. 1, as a dot-dashed line, is an ignition-angle limiting value $\alpha_{limit}$. The ignition-angle limiting value $\alpha_{limit}$ is made up of the ignition angle value from the map $\alpha_{map}$, said value having already been described, and an additional ignition angle $\Delta\alpha_{inc}$.

The increment ignition angle $\Delta\alpha_{inc}$ is dependent on the actual value of the boost pressure and the speed n of the internal combustion engine.

Figure 2:
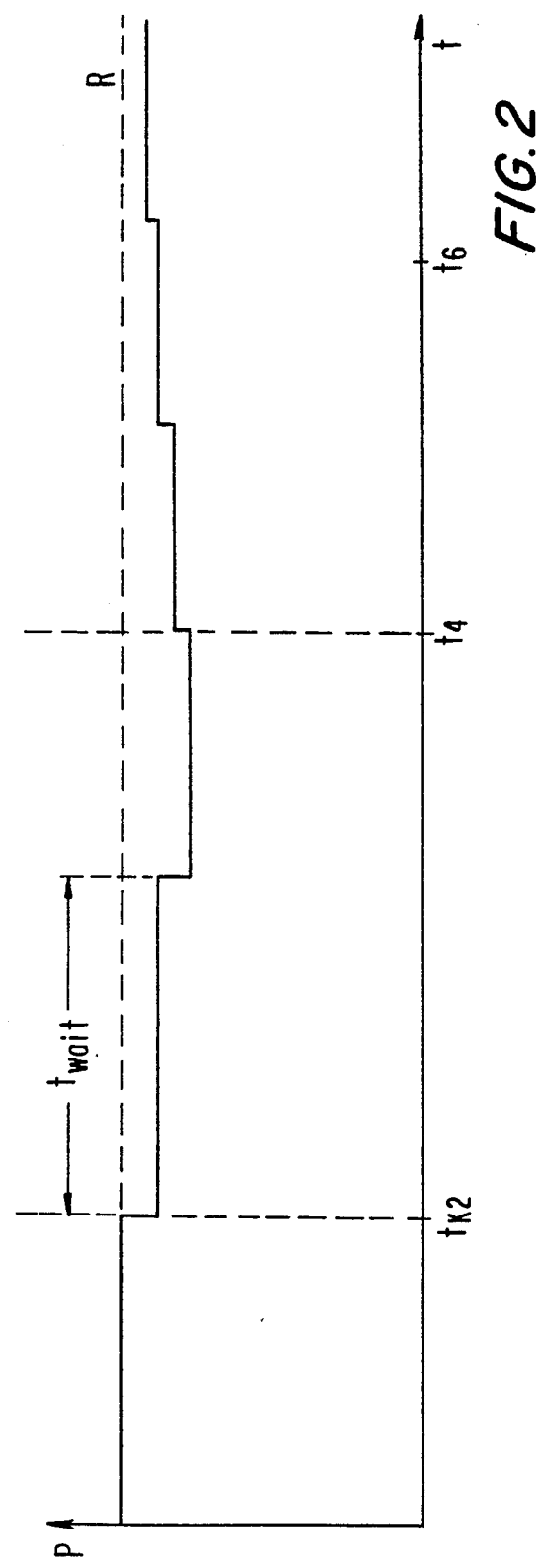
FIG. 2 is a graphical illustration which indicates the boost pressure curve belonging to FIG. 1 of the turbocharger of the internal combustion engine.

As soon as the current ignition angle $\alpha$ assumes the ignition-angle limiting value $\alpha_{limit}$ due to the ignition retardation performed (see time $t_{K2}$ of FIG. 1), then—starting from the boost pressure setpoint value $P_{set}$—a reduction of the boost pressure P is performed stepwise until the above condition is no longer fulfilled (time $t_4$ in FIGS. 1 and 2). The time between two boost pressure reductions amounts to $t_{wait}$. According to FIG. 2, this boost pressure reduction is likewise effected stepwise, e.g. 0.1 bar per step. The boost pressure reduction prevents the exhaust gas temperature of the turbocharged internal combustion engine increasing due to the ignition angle retardation triggered by knocking since this increase could lead to temperature problems of the turbocharger. The already mentioned boost pressure setpoint value $P_{set}$ is dependent on the operating condition, in particular there exists a dependence on the speed n and the throttle-valve opening angle TV of the internal combustion engine.

FIG. 1 illustrates that, after time $t_{K3}$, the knocking of the cylinder has ceased. A further adjustment of the ignition angle α in the "retarded" direction is accordingly not carried out; on the contrary, the controlled resetting of the ignition angle α is performed. This controlled resetting or resetting is likewise effected stepwise, e.g. 3° within 10 seconds in 0.3° steps. This has the effect that, at time $t_4$, the current ignition angle α reassumes the ignition-angle limiting value $α_{limit}$. As a consequence, a boost pressure increase is performed. The raising of the boost pressure is effected, for example every 20 seconds, by 0.1 bar. At time $t_5$, the current ignition angle α reaches the ignition angle value from the map $α_{map}$ again due to the resetting and, at time $t_6$, the boost pressure P of the turbocharger has been brought back to the boost pressure setpoint value $P_{set}$. If renewed knocking of a cylinder occurs subsequently, the procedure described is repeated in a corresponding manner.

Figure 3:
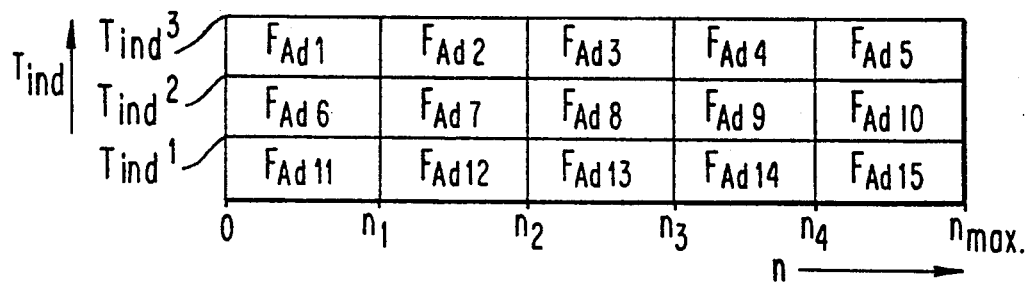
FIG. 3 is a table showing the boost pressure reduction

The boost pressure reduction explained above with reference to FIGS. 1 and 2 is recorded by means of an adaptation factor $F_{Ad}$. This adaptation factor $F_{Ad}$ can assume the value between 0 and 1. The reduction of the boost pressure is proportional to the adaptation factor $F_{Ad}$. It is stored in an adaptation map as a function of the operating condition of the internal combustion engine. According to the invention, the procedure is such that in each case the current adaptation factor $F_{Ad}$ of the respectively associated operating condition is stored in the adaptation map, an already present, earlier adaptation factor $F_{Ad}$ for the same operating condition being overwritten. Since the boost pressure reduction is effected stepwise, the value of the adaptation factor $F_{Ad}$ likewise only changes stepwise, for example by steps of 0.1. The adaptation factors $F_{Ad}$ assigned to the respective operating conditions are stored—in accordance with FIG. 3—as a function of the induction temperature $T_{ind}$ and the speed n of the internal combustion engine. For example, the adaptation factor $F_{Ad7}$ is applicable for the speed range $n_1$ to $n_2$ and the temperature range $T_{ind1}$ to $T_{ind2}$. This adaptation factor $F_{Ad7}$ is the instantaneously valid adaptation factor for the said operating condition; it has, for example, a value of 0.5. This value was assumed to be the current value in the process explained by reference to FIGS. 1 and 2. If the operating condition is departed from, for example due to an acceleration process but then reassumed, the stored adaptation factor $F_{Ad7}$ of 0.5 is immediately used as "starting value" for the boost pressure reduction once more, i.e. the old, "learned" value is used again. If when the operating condition under consideration is reached again as described, during the course of further operation, it transpires that the value 0.5 is not sufficient but that a further boost pressure reduction step must be performed, then it is overwritten with or replaced by the value 0.4; i.e. the adaptation factor $F_{Ad7}$ is stored with the value 0.4. From this it is evident that, when an operating condition already reached is repeated again, it is possible to immediately retrieve the adaptation factor $F_{Ad7}$ stored in each case, with the result that a boost pressure reduction which prevents the occurrence of temperature problems of the turbocharger occurs immediately. Furthermore, the corresponding adaptation factor is continuously updated. The connection between the adaptation factor $F_{Ad}$ and the boost pressure P is given by a mathematical relationship. Accordingly, the boost pressure reduction is performed by forming the difference between the boost pressure setpoint value $P_{set}$ corresponding to the instantaneous operating condition and an operating-condition-independent normal boost pressure setpoint value $P_{setnorm}$ corresponding to the ambient pressure and multiplying it by the respectively corresponding adaptation factor $F_{Ad}$.

The adaptive closed-loop knock control described should only be operative in the warmed-up internal combustion engine. During the cold-running phase, a nonadaptive process is provided. Accordingly, the adaptation factors $F_{Ad}$ are only stored when the temperature $T_{eng}$ of the internal combustion engine is higher than an enabling temperature $T_{enable}$. As soon as the temperature $T_{eng}$ of the internal combustion engine is above the enabling temperature $T_{enable}$, adaptive closed-loop knock control takes place, i.e. the stored current adaptation factors $F_{Ad}$ are retrieved and used as a function of the operation condition.

Provision can preferably be made for the adaptation factors $F_{Ad}$ to be increased only when the throttle-valve opening angle TV has exceeded a minimum value $TV_{min}$. This minimum value $TV_{min}$ is dependent on the speed n of the internal combustion engine.

Figure 4:
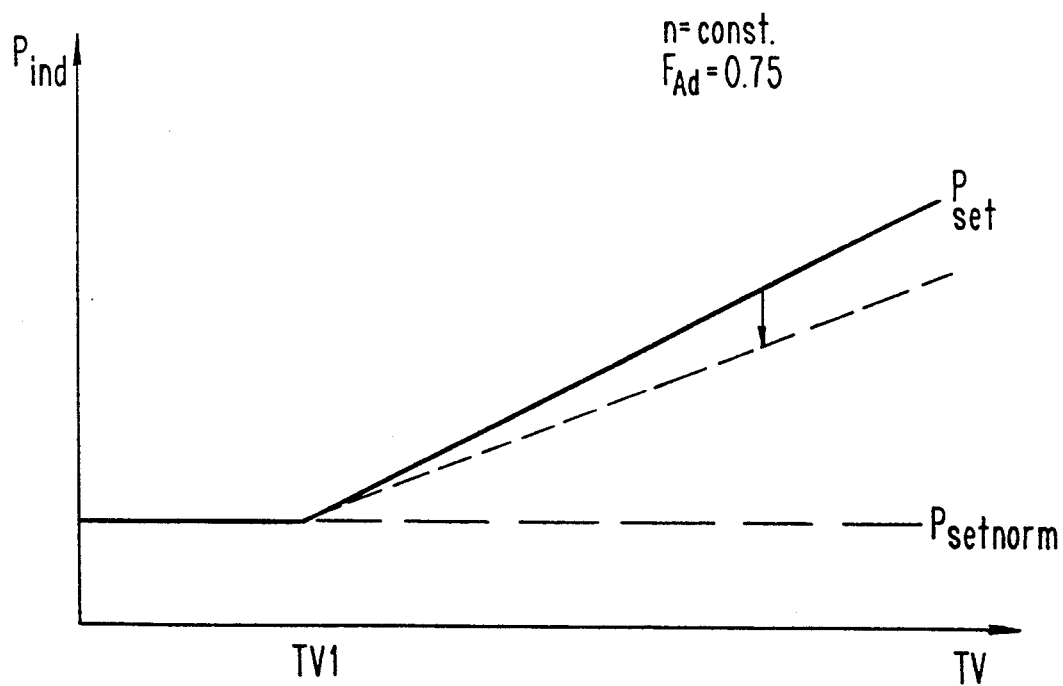
FIG. 4 is a graphical illustration of an adaptation map.

FIG. 4 shows the graphical relationship of the intake manifold pressure (on the ordinate) to the throttle-valve opening angle, TV (on the abscissa). The values shown in this graphical illustration apply to a specific speed n and an adaptation factor $F_{Ad}$ of 0.75. In it, the normal boost pressure setpoint value $P_{setnorm}$ is represented as a dot-dashed line. It can be seen that, from a certain throttle-valve opening angle TV1 onwards, the boost pressure setpoint value $P_{set}$, represented by a solid line, rises. The arrow shown in the diagram of FIG. 4 indicates how a particular point of the characteristic $P_{set}$ leads, by the multiplication with the adaptation factor $F_{Ad}$, to a new point which lies on a characteristic plotted in dashed lines.

Figure 5:
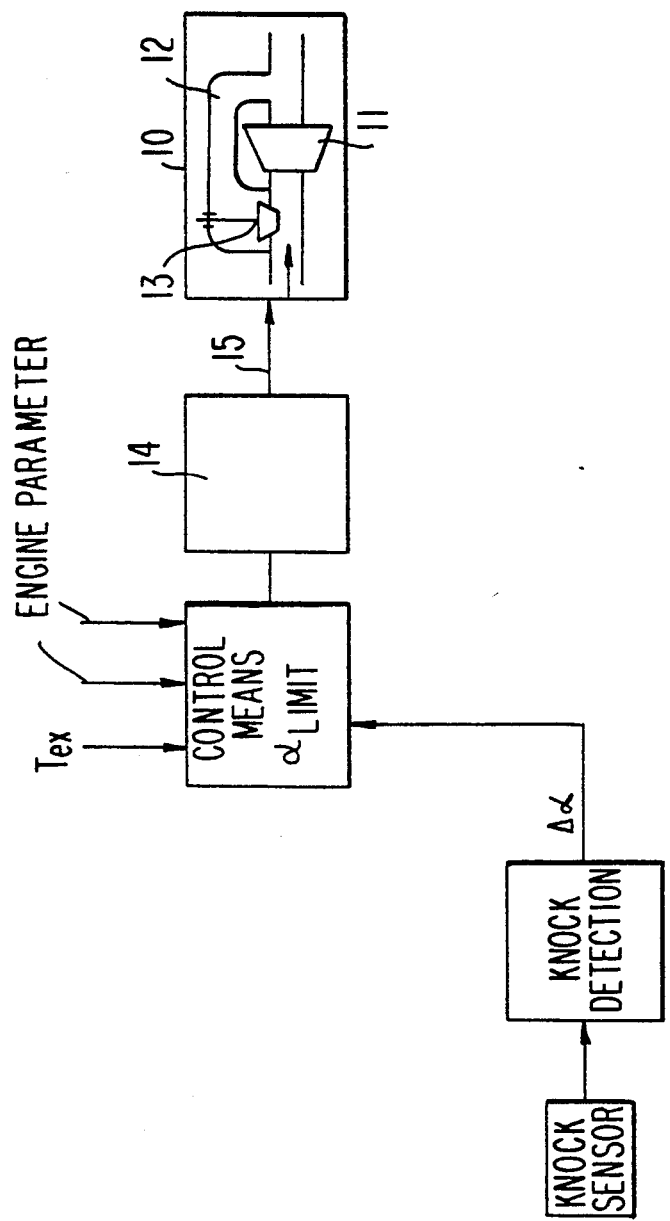
FIG. 5 shows a device for implementing the inventive method.

FIG. 5 shows an internal combustion engine, a turbocharger, a control means as an exemplary embodiment. It is to be understood that other embodiments are also possible. FIG. 5 shows a knock sensor for elimination of knocking of a subsequent knock recognition and ignition angle adaptation adjustment Δα with recognized knocking. The Figure also shows the control means which determine an operational parameter of the internal combustion engine, such as for example exhaust gas temperature $T_{ex}$. Based on the actual ignition angle, during reaching or exceeding the ignition angle limiting value $α_{limit}$, a signal is provided at the controller for the boost pressure which is identified with reference numeral 14, and the boost pressure device of the turbocharger is correspondingly controlled through a connection 15. The boost device 10 is shown schematically with turbine 11 and a bypass passage 12 whose inlet opening is controlled by a valve 13. The above mentioned elements are well known. This characteristic is described by the relationship $$P_{set} - (P_{set} - P_{setnorm}) \times (1 - F_{Ad}).$$

While the invention has been illustrated and described as embodied in an adaptive closed-loop knock control, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. In a method for closed-loop knock control of an internal combustion engine having at least one cylinder and a turbocharger providing a boost pressure of the internal combustion engine, an ignition angle being associated with each of said cylinders, said method comprising retarding at least one of said ignition angles by ignition timing control means when one of said cylinders knocks and subsequently resetting the at least one ignition angle, the improvement comprising the steps of:
   a) reducing the boost pressure of the internal combustion engine by boost pressure control means when the at least one ignition angle reaches an ignition-angle limiting value dependent on the exhaust gas temperature of the internal combustion engine;
   b) increasing the boost pressure by boost pressure control means when the at least one ignition angle again reaches the ignition-angle limiting value due to resetting of the ignition angle;
   c) storing boost pressure and associated ignition angle values as a function of internal combustion engine operating conditions for an adaptive process control during performance of steps a) and b); and
   d) retrieving and using said boost pressure and ignition angle values so stored in step c) for current values of the operating conditions when said current values are being used in operation of said internal combustion engine.

2. The improvement as defined in claim 1, further comprising also storing the ignition angle for each of said cylinders as a function of the respective operating conditions of each of said cylinders.

3. The improvement as defined in claim 1, wherein said retarding and said resetting of said ignition angle are effected in a stepwise manner.

4. The improvement as defined in claim 1, wherein said reducing and said resetting of said boost pressure are also performed in a stepwise manner.

5. The improvement as defined in claim 1, further comprising the steps of providing a map giving the relationship of the ignition angle to the operating conditions and selecting a current value of the ignition angle using the map and current values of the operation conditions.

6. The improvement as defined in claim 5, wherein the current value of the ignition angle is equal to the sum of an ignition angle value obtained from the map for the current values of the operating conditions and an ignition-angle retardation component.

7. The improvement as defined in claim 5, wherein the ignition-angle limiting value is determined from the map and an ignition angle increment dependent on an actual value of the boost pressure and the speed of the internal combustion engine.

8. The improvement as defined in claim 1, wherein the ignition-angle limiting value is a sum of individual ignition angles for each of said cylinders.

9. In a method for closed-loop knock control of an internal combustion engine having at least one cylinder and a turbocharger providing a boost pressure of the internal combustion engine, an ignition angle being associated with each of said cylinders, said method comprising retarding at least one of said ignition angles by ignition timing control means when one of said cylinders knocks and subsequently resetting the at least one ignition angle, the improvement comprising the steps of:
   a) reducing the boost pressure of the internal combustion engine by boost pressure control means when the at least one ignition angle reaches an ignition-angle limiting value due to resetting of the ignition angle;
   c) storing boost pressure and associated ignition angle values as a function of internal combustion engine operating conditions for an adaptive process control during performance of steps a) and b); and
   d) retrieving and using said boost pressure and ignition angle values so stored in step c) for current values of the operating conditions when said current values are being used in operation of said internal combustion engine, said reducing of said boost pressure being performed by multiplying a difference between a boost pressure setpoint value corresponding to an instantaneous value of the operating conditions and an operating-condition-independent normal boost pressure setpoint value corresponding to an ambient pressure by an adaptation factor.

10. The improvement as defined in claim 9, further comprising storing said adaptation factor in an adaptation map according to the induction temperature and the speed of the internal combustion engine.

11. The improvement as defined in claim 10, wherein each of said adaptation factors in said adaptation map is assigned the induction temperature range and a speed range.

12. The improvement as define din claim 11, wherein said storing is performed in a write-read memory.

13. The improvement as defined in claim 10, wherein said storing occurs only if a temperature of the internal combustion engine is higher than an enabling temperature.

14. The improvement as defined in claim 13, further comprising resetting the adaptation factor to the neutral starting value "one" after restarting the internal combustion engine, and subsequently using only a single adaptation factor for all operating conditions when said temperature of said internal combustion engine is less than said enabling temperature.

15. The improvement as defined in claim 9, wherein the boost pressure setpoint value depends on the speed of the internal combustion engine and the throttle-valve opening angle of the internal combustion engine.

16. The improvement as defined in claim 10, wherein said adaptation factors stored during said storing are used when said internal combustion engine is restarted and a temperature of said internal combustion engine is greater than an enabling temperature.

17. The improvement as defined in claim 10, wherein the adaptation factors are increased only when a throttle-valve opening angle has exceeded a minimum value.

18. The improvement as defined in claim 17, wherein the minimum value depends on the speed of the internal combustion engine.

* * * * *